FIG. 2

Jan. 31, 1961   E. R. McCLELLAND   2,969,867
FRUIT TRANSFER APPARATUS
Original Filed Aug. 12, 1952   9 Sheets-Sheet 3

INVENTOR
ETHERIDGE R. McCLELLAND
BY
his ATTORNEY

INVENTOR
ETHERIDGE R. McCLELLAND
BY
Allen and Chromy
his ATTORNEY

Jan. 31, 1961     E. R. McCLELLAND     2,969,867
FRUIT TRANSFER APPARATUS Original Filed Aug. 12, 1952           9 Sheets-Sheet 9

FIG.14

INVENTOR.
ETHERIDGE R. McCLELLAND
BY
*his* ATTORNEYS

# United States Patent Office 2,969,867
Patented Jan. 31, 1961

2,969,867

FRUIT TRANSFER APPARATUS

Etheridge R. McClelland, San Pablo, Calif., assignor, by mesne assignments, to Filper Corporation, a corporation of California Original application Aug. 12, 1952, Ser. No. 303,913, now Patent No. 2,786,562, dated Mar. 26, 1957. Divided and this application Jan. 16, 1957, Ser. No. 634,546

5 Claims. (Cl. 198—33)

This application is a division of my co-pending application Serial No. 303,913, filed August 12, 1952, now Patent No. 2,786,562.

The present invention relates to apparatus for the positioning or orientation of fruit articles and is concerned more particularly with apparatus of the above character in which the fruit such as peaches, after being automatically oriented is conveyed to a feed position and then is fed to a pitting mechanism.

It is the general object of the invention to provide orienting means of a vertical character which provides for an improved orienting action, economy of space in a cannery, for ease of feeding of the fruit, and which facilitates transfer to the pitting mechanism.

Another general object of the invention is to provide improved transfer means for taking fruit from an oriented position and placing it in properly oriented position in the pitter for the pitting operation.

Other objects and advantages of the invention will be apparent from the following description of a preferred embodiment thereof, as illustrated in the accompanying drawings, in which.

Figure 1:
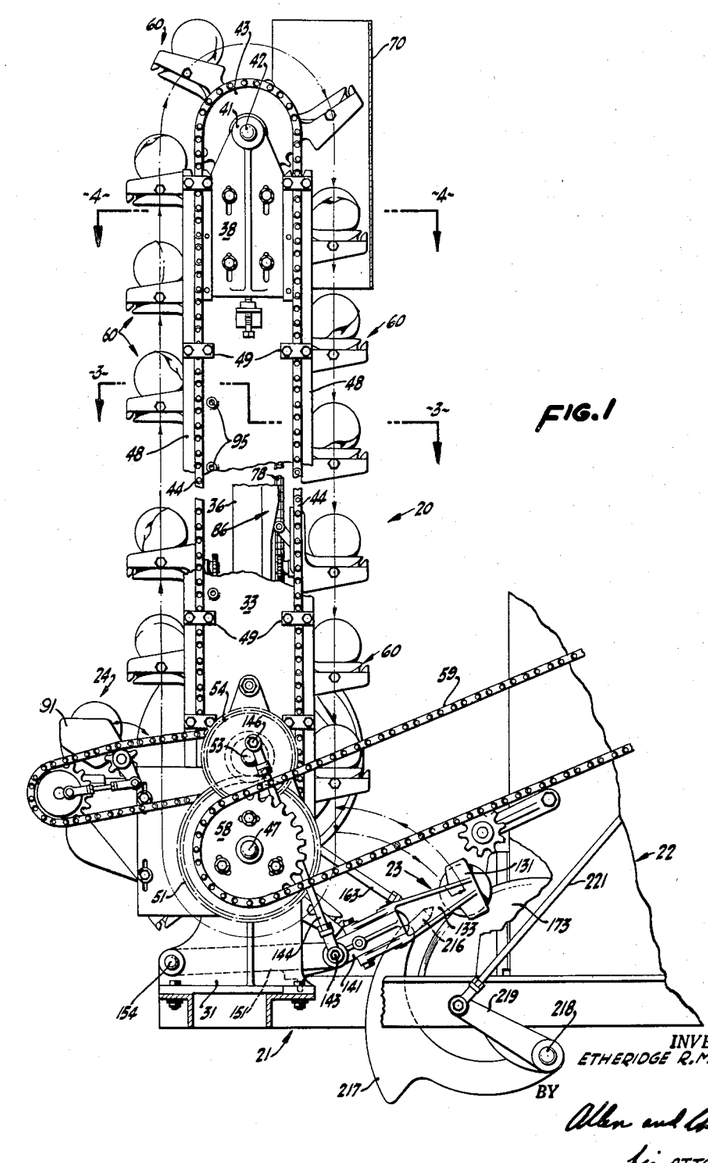
Figure 1 is a side elevational view of the orienting apparatus.
Figure 2:
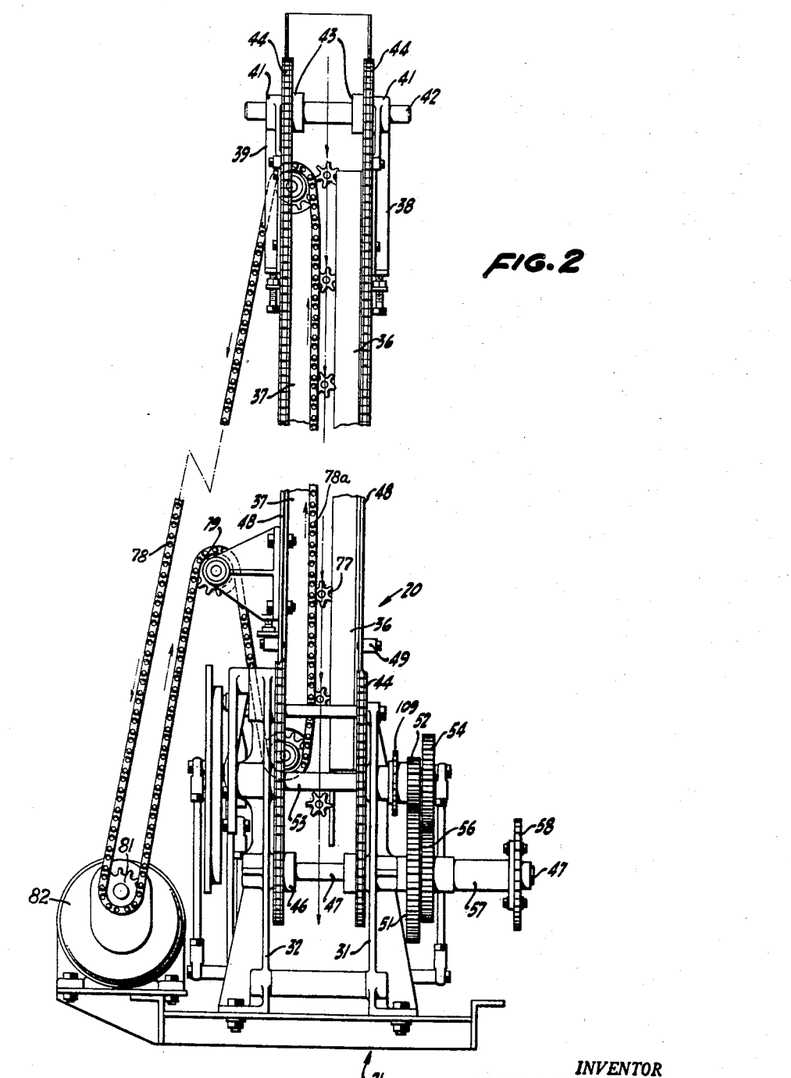
Figure 2 is an end elevational view with the orienting pockets omitted from the view.
Figure 3:
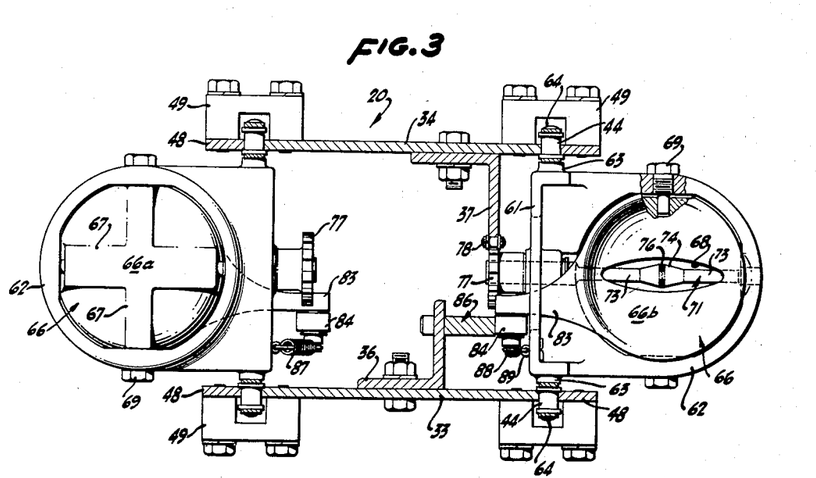
Figure 3 is a horizontal sectional view taken in planes indicated by the line 3—3 in Figure 1.
Figure 4:
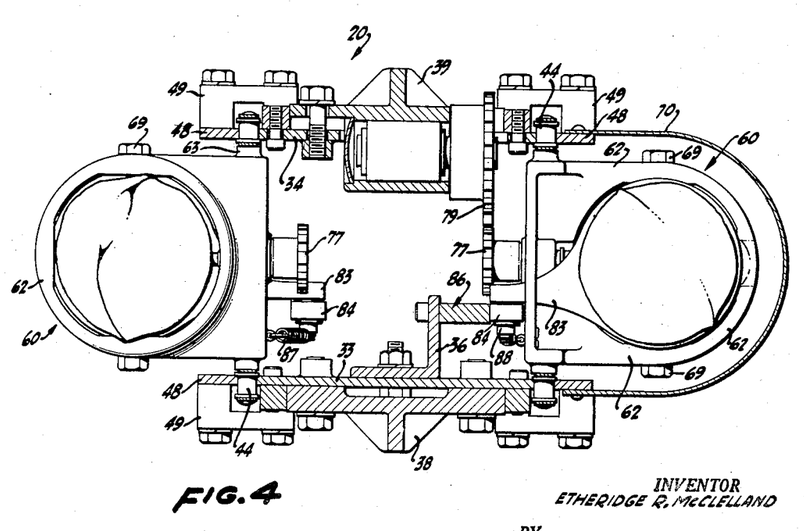
Figure 4 is a horizontal sectional view taken as indicated by the line 4—4 in Figure 1.

Referring to Figures 1 and 2, the orienting and positioning apparatus of the instant invention includes generally an orienting unit 20 supported in upright position on a framework 21 secured to a peach pitter 22 of conventional construction. A transfer mechanism 23 is provided for effecting transfer of oriented fruit from the orienting unit 20 to the pitter 22, and the orienter is fed by a feed unit 24 which supplies one peach at a time to the orienting unit 20.

The orienting unit 20 as stated above is of the upright type, and as shown herein, occupies no more floor space with reference to the peach pitter than that occupied by an operator manually feeding fruit to the pitter. The orienting unit 20 comprises generally an endless series of pocket structures carried vertically up through a path in which fruit may be fed thereto and then vertically downward through an orienting path, during which the orientation of the fruit is accomplished, first with respect to location of the fruit by the stem indent in the fruit and thereafter location of the fruit with respect to its suture line, so that the fruit will be in proper position when it is transferred to the pitting unit to be split in a plane containing the natural division between the two pit halves of the fruit. The orienting unit 20 (Figures 1, 2, 3 and 4) has a frame structure including two opposed upright base castings 31 and 32 secured to and above the framework 21, and respective side plates 33 and 34 secured adjacent the upper end of the respective base castings 31 and 32 and extending upwardly therefrom. Side plates 33 and 34 are provided with stiffening angles 36 and 37, respectively, which also serve as mounting brackets. At the upper end of the respective side plates 33 and 34, there are provided journal brackets 38 and 39 adjustably secured thereon and carrying at the upper end respective bosses 41 for the support shaft 42 of a pair of idle sprockets 43 for respective parallel chains 44 which extend downwardly and are trained about a pair of drive sprockets 46 mounted on a drive shaft 47 carried in suitable bosses of the base castings 31 and 32. To insure linear travel of the stretches of the chains 44 extending between the respective sprockets, guide strips 48 are secured in spaced relation at either edge of respective plates 33 and 34 by suitable brackets 49 spanning the portions of chain passing therethrough.

The drive for the shaft 47 is through a gear 51 (Figure 2) secured thereon which meshes with a smaller gear 52 on a second drive shaft 53 journaled in suitable bosses of the base castings 31 and 32, the shaft 53 also carries a gear 54 meshing with a gear 56 journaled on the drive shaft 47 and connected to a sleeve 57 carrying a drive sprocket 58. As seen in Figure 1, the drive sprocket 58 is connected by a chain drive 59 to suitable driving mechanism of the pitter 22.

The endless series of orienting devices or pocket structures carried by the respective chains 44 are operated to secure a rapid hunting and location of the stem indent of the fruit placing the indent in a desired position, and then to provide for automatic alignment of the suture line of the fruit in a given position. In the embodiment shown, this desired position is with the plane of the suture passing through the desired plane of splitting of the fruit and is parallel to the plane of the view in Figure 1 and with the stem-blossom axis of the fruit vertical, the stem cavity being located downward. As seen in Figures 1, 3, 4 and 8, the chains 44 carry a series of equally spaced apart pocket structures 60 which have fruit receiving pockets on either side thereof, one pocket being effective during the feed of the fruit to the orienting mechanism and the other pocket being effective during orientation of the fruit. Each pocket structure 60 comprises an L-shaped frame 61—62 having a pair of aligned bosses 63 at one end, by means of which it is pivoted on a pair of aligned extended pivot pins 64 of the chains 44. The frame portion 61 extends along the chain and at the other end is provided with a pair of slots 65 engaging a second pair of extended pivot pins 64, so that during the linear portion of the travel of the chain, the pocket structure 60 will be positively located in position. The slots 65 accommodate the relative movement between the chains and the frame when the pocket structure is passing around a turn in its path of travel.

The frame 61—62 (Figures 1, 3 and 8) also includes a laterally projecting apertured portion or boss 62 which provides a mounting for the pocket element 66. The pocket element 66 is provided on one side with a concave surface or feed pocket 66a having crossed ribs 67 (Figure 3) for supporting a fruit therein after feeding of the fruit thereto during the upward travel of a pocket structure 60. As a pocket structure 60 rounds the turn at the top of the apparatus, its feed pocket 66a discharges its fruit, with the assistance of a guide chute 70, into the orienting pocket of the preceding pocket structure 60. The other side of each pocket element forms a concave orienting pocket 66b provided with an elongated bottom opening 68. The pocket member 66 is mounted for rocking movement about a transverse axis in the pocket structure, and for this purpose is provided with opposite threaded apertures to receive pivot pins or studs 69 suitably journaled in aligned apertures in the opposite side walls of the frame portion 62. It will be seen that the axis of this rocking movement of the pocket structure is horizontal and lies in a plane parallel to the path of travel of the chain.

An elongated orienting means is mounted in the pocket structure boss 62 (Figures 3, 5 and 9) and comprises a shaft 71 journaled respectively in bushings 72 in aligned apertures in the frame 61—62 and extending through a central aperture in alignment with opening 68. The shaft 71 is rotatable around a substantially horizontal axis and has two end shaft or suture locating parts or portions 73 of reduced diameter at either side of the pocket joined to two central conical or indent locating parts or portions 74 having a common knurled apex connection 76. The portions 74 and 73 of the shaft are eccentric with respect to the endmost journaling portions of the shaft 71 so that in addition to its rotative movement the orienting portions 73 and 74 are given a jogging movement having an up and down component and a horizontal component with respect to a fruit in the pocket. The sprocket 77 is mounted on the end of each shaft 71 for rotation of the elongated orienting member during its downward travel along the orienting path. This sprocket 77 meshes with a chain 78 (Figure 2) and the chain 78 travels over a plurality of idler sprockets 79 and is driven from a drive sprocket 81 on a constantly running motor 82 secured on the frame structure 21. The spacing and location of the sprocket 79 provides an upwardly moving straight stretch 78a of the chain guided by the angle 37 and which coincides with the travel of the pocket structures along their orienting path and engages the small sprockets 77 during their downward travel to effect rapid rotation of the orienting element.

To assist in the orienting operation, particularly in the hunting and location of the stem indent, the pocket element 66 is subjected to a rocking movement to change the position of the fruit in a cup with respect to the shaft portions of the elongated orienting element. Each pocket element 66 (Figures 3, 4, 8 and 9) is provided with a projecting control arm 83 carrying a roller 84 at the end thereof which engages an elongated cam member or track 86 carried by the angle 36 and having a succession of cam rises 86a and 86b. The arm 83 is spring urged counter-clockwise, as viewed in Figure 9, by a coil spring 87 extending between the journal pin 88 for the roller 84 and a suitable fastening 89 (Figure 3) on the frame of the pocket structure. The cam rises 86b being spaced closer together than the cam rises 86a and located near the end of the travel along the orienting path near its lower end, the cam track 86 has a straight portion 86c to hold the pocket element 66 level during pick-up of a fruit, and an end rise 86d to aid in fruit removal.

The operation of the orienting structure in providing the desired location of a fruit during its travel along the orienting path will be described in detail hereinafter.

The transfer mechanism disclosed herein comprises means for grasping an oriented peach while it is resting in the cup and means for swinging the peach from the orienting mechanism and impaling it in oriented position upon a blade of a peach pitter, this mechanism being operated in synchronism with the peach pitter. The transfer mechanism includes means for traveling in a linear direction with the orienting apparatus and the peach in a pocket structure therein, so as to pick up the peach securely in its oriented position and thereby present it in the desired position to the peach pitting mechanism.

Figures 5, 5A, 6:
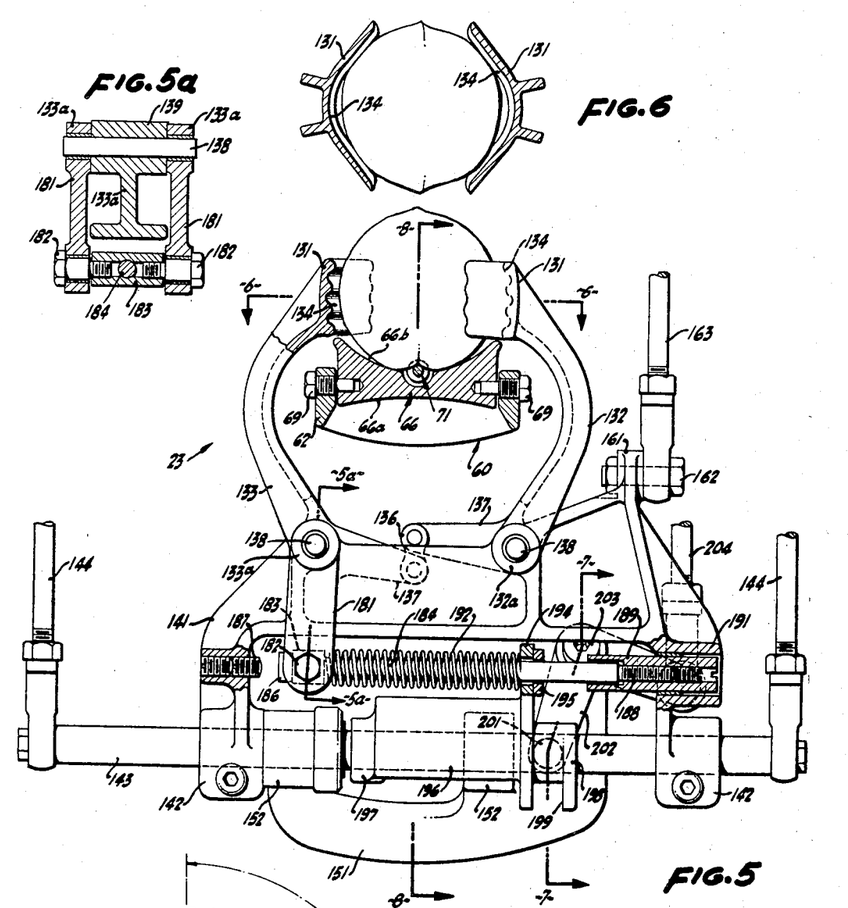
Figure 5 is a sectional elevational view taken as indicated by the line 5—5 in Figure 13.
Figure 5a is a detail section on the line 5a—5a of Figure 5.
Figure 6 is a fragmentary sectional view taken as indicated by the line 6—6 in Figure 5.
Figure 11:
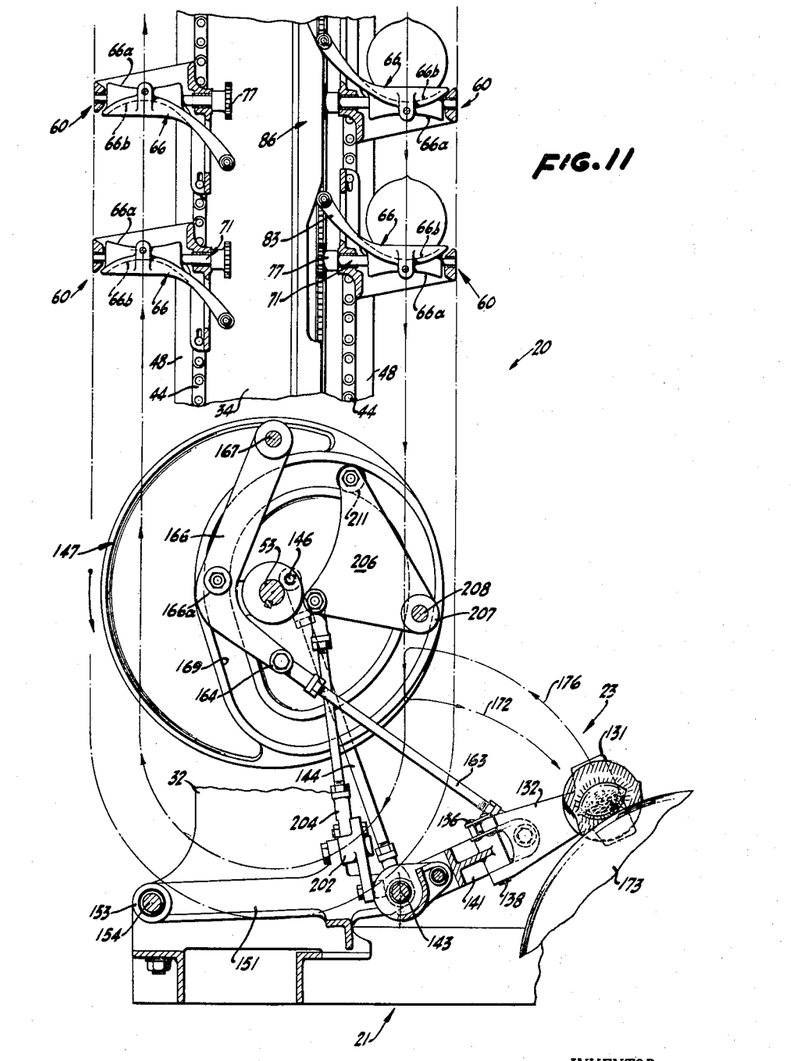
Figure 11 is an enlarged sectional and part elevational view of the fruit transfer apparatus indicated at the lower end portion of Fig. 1.

Referring to Figures 1, 5 and 11, the transfer mechanism includes a pair of opposed peach gripping jaws 131 carried at the upper ends of respective arms 132 and 133. The jaws 131 present respective concave surfaces to grip the peach having transverse ribs 134 on the peach gripping surface. The jaw levers 132 and 133 are connected by a link 136 pivoted respectively to the inwardly projecting arm portions 137 thereof. The pivot pins 138 for the respective arms 132 and 133 are mounted in spaced apart apertured ears 132a and 133a and in respective bosses 139 at the upper end of a swinging bracket member 141. Member 141 has respective split clamping bosses 142 which engage a shaft 143 supported by respective links 144 pivotally connected at their upper ends to respective eccentric drive pins 146 on the drive shaft 53. The pins 146 are carried respectively to the gear 54 and a cam member 147 referred to hereinafter. A movement control link 151 (Figures 1, 5 and 11) for the pivot shaft 143 and brackets has a pair of bosses 152 having journaled engagement with the shaft 143 and extending to the left therefrom as shown in Figure 11 and having a boss 153 pivoted on a cross shaft 154 extending between the respective frame castings 31 and 32.

Figure 14:
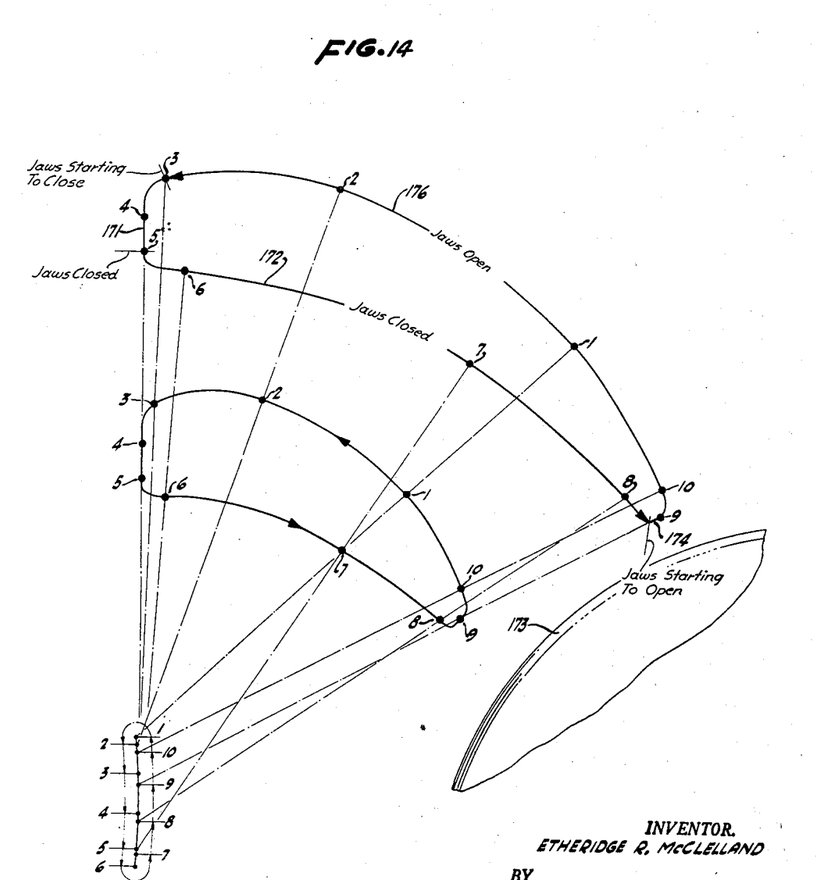
Figure 14 is a schematic view of the transfer mechanism illustrating the timing.

From the above description it will be seen that operation of the links 144 by their eccentric drive serves to move the jaws 131 vertically in a timed movement, and means are also provided to rock the jaw-supporting bracket in timed relation to the vertical movement, and to open and close the jaws also in timed relation to the other two movements. To control rocking movement of the jaws to and from the orienting apparatus and the pitter, i.e., between the positions thereof shown in Figures 8 and 11, the support bracket 141 (Figures 5 and 11) has a boss 161 in which a pivot pin 162 is mounted for a control link 163 which extends upwardly and to the left therefrom as shown in Figure 11, and has a pivotal connection at 164 with a lever 166 at its upper end pivotally mounted at 167 in a boss 168 of the frame bracket 32 (Figure 2). Intermediate its ends the lever 166 (Figure 11) has a cam follower roller 166a engaged with a cam track 169 in the cam member 147 and the movement of the lever 166 under the control of the cam track 169 produces a back and forth movement of the jaws about their pivotal axis 143 in timed relation to the opening and closing thereof and in timed relation to the raising and lowering of their pivot axis 143. The cam 169 provides effectively a dwell at each end of the movement so that the path of the jaws 131 as indicated in Figures 11 and 14 include a vertical portion 171 when the jaws are in alignment with a pocket structure and are traveling downwardly at the same rate of speed being moved from open to closed position as later described, a portion 172 in which the jaws are traveling toward the impaling blade 173 of the peach pitter, an end portion 174 in which the jaws have a slight movement along the impaling blade 173 and then a return path of movement 176 when they are returned to the upper portion of the path 171.

As previously stated, means are provided for opening and closing the jaws in timed relation to the orienting apparatus and the peach pitter so that they are closed upon a peach in a pocket. The pocket then recedes from the peach and the peach is then transferred to the blade 173 with the jaws closed and after impaling of the peach upon the blade 173, the jaws are opened and returned in their opened condition to alignment with the next succeeding pocket structure of the orienting apparatus. Referring to Figures 5, 8, 10 and 11, the arm 133 for one of the jaws 131 is provided with a depending portion 181 which has a split end carrying respective pivot pins 182 (Figures 5 and 5a) engaging an apertured block 183 which receives a shaft 184 whose head 186 is positioned for engagement with a stop screw 187 which limits closing movement of the jaws. The reduced thread end 188 of the shaft 184 carries a thimble 189 passing freely through a boss 191 of the bracket member 141. A spring 192 surrounds the shaft 184 and is engaged with the block 183 at one end and an apertured flange 194 of an operating member 196 having respective bosses 197 and 198 slidably engaged with the shaft 143. A washer 195 is placed on shaft 184 between flange 194 and the end of the thimble 189.

Figure 7:
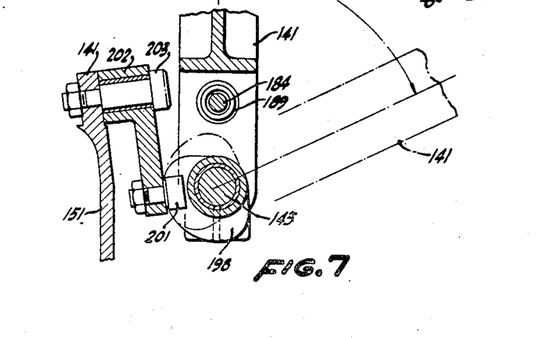
Figure 7 is a fragmentary sectional view taken as indicated by the line 7—7 in Figure 5.

The operating sleeve or member 196 (Figures 5 and 7) is provided with a slotted portion 199 which is engaged by a pin 201 secured in a depending arm of a bellcrank 202 which is pivoted by a pin 203 in the bracket member 141. The other arm of the bellcrank 202 is pivotally connected to a link 204 (Figures 5, 10 and 11) which is connected at its upper end to a cam follower member 206 which has a boss 207 pivoted on a pin 208 carried by the frame casting 32. The cam follower lever 206 has a cam follower roller 211 engaging in the cam track 169 in trailing relation with respect to the cam roller 166a of the jaw swinging mechanism. The jaws 131 (Figures 11 and 12) are moved from open to closed position during travel of the jaws along their path portion 171, remain closed during the travel of the jaws along their path portion 172, are opened near the end of their travel along the path portion 174 and remain open during their travel along the path portion 176.

It will be seen that the jaw closing movement is effected through the spring 192 (Figures 5 and 10) so that the jaws 131 yieldably engage a peach and accommodate themselves to differences in diameter. Also the adjustment of thimble 189 determines the amount and timing of positive opening movement of the jaws.

In the pitter, there is provided a pusher or feeder of conventional construction for engaging the peach impaled on the blade 173 after it is released by the jaws 131 and this pusher comprises a pin 216 (Figure 1) having a tapered end for engaging the stem indent of the peach, the pin 216 being carried at the upper end of a swinging arm 217 which is pivotally mounted at 218 and operated through an arm 219 and a link 221 from a suitable drive mechanism of a conventional peach pitter. This pitter may be of the type disclosed in the patent to Perrelli et al., No. 2,336,123.

Figure 9:
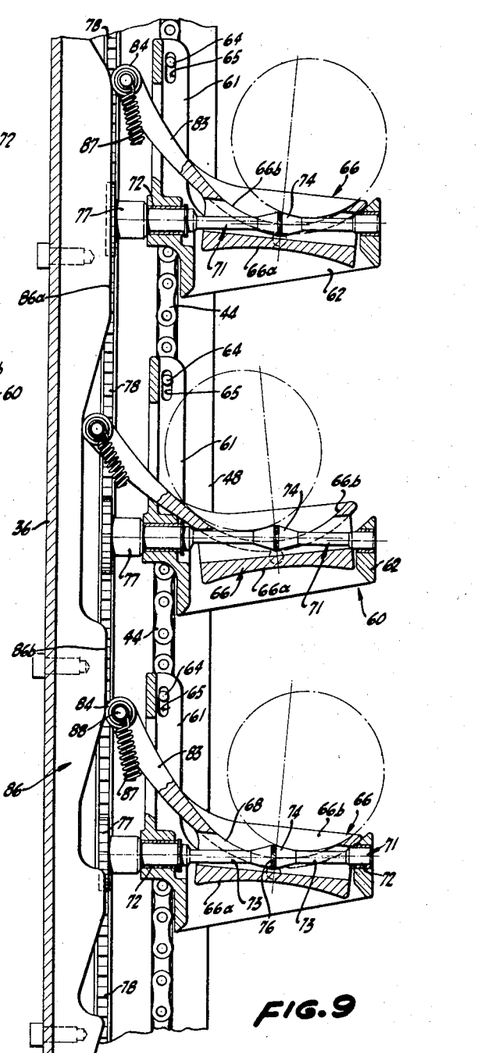
Figure 9 is a view similar to Figure 8 but at a point spaced above the transfer means shown in Figure 8 illustrating different positions of the orienting pockets.

The operation of the apparatus will be described with reference to peaches. Peaches are fed one by one by the pocket 91 (Figure 1) of a suitable feed mechanism as described and claimed in my co-pending application Serial No. 634,545, filed January 16, 1957, now Patent No. 2,929,488, to the respective feed pockets 66a which are in peach receiving position in the ascending run of the pocket structures 60. These peaches as they are carried around the upper turn of the pocket path (Figure 1) are deposited from the feed pocket 66a of one pocket structure 60 into the orienting pocket 66b of the immediately preceding pocket structure 60, the guide casing or chute 70 being provided to insure the peach being delivered into the pocket 66b. As a pocket structure 60 starts its downward travel, the sprocket 77 of the pocket engages the straight run of the chain 78 (which may be either ascending or descending) and is revolved rapidly with its shaft 71. At about the same time the roller 84 of the pocket element 66 engages the vertical cam member 86 and is rocked alternately back and forth by the cam rises 86a at the upper end of the track. This serves to re-orient or shift the peach repeatedly with respect to its rotating cone structures 74 as shown in Figure 9. The cone portions 74 operate to revolve the peach rapidly about shifting horizontal axes until its elongated stem indent becomes engaged over or registers with the conical portions 74 of the shaft 71 and so turning of the peach about a horizontal axis will cease. By virtue of the reversing of the position of the pocket element 66 as illustrated in Figure 9, the tendency of some peaches to establish a stable position of rotation will be interrupted, and the stem indent will be rapidly aligned with the shaft 71 and engaged over the conical portions 74 thereof. It will be noted in Figure 9 for example, in the upper view, the peach is engaged with the right hand conical portion 74, in the middle position, the pocket structure has been oscillated counter-clockwise so that the peach has been rolled over to the left hand conical portion. In the bottom position the pocket has been oscillated clockwise so that the peach is again engaged with the right hand conical portion 74 and its axis of rotation again shifted. This operation continues as the pocket structures descend and the oscillation of the pocket element 66 is made more rapid by the greater frequency of the cam rises 86b as the end of the travel approaches.

As stated above, this indent hunting operation on a peach by the orienting mechanism is to locate the stem indent in a downward position, and then the orienting mechanism operates to orient the peach with respect to the elongated shape of the stem indent and place it in alignment with the elongated orienting member or shaft 71. It will be recalled that the conical portions 74 and the end shaft portions 73 are mounted eccentrically with respect to their axis of rotation as indicated in Figure 9 for example, so that in addition to the rotative effect, there is a continual jogging effect imparted to the peach, which has both a vertical and a horizontal component of motion. By virtue of the shifting of the peach from one side of the center point 76 of the elongated member, the horizontal component of the jogging action will have the same turning effect in rotating a misaligned peach about its stem-blossom axis.

After the stem indent settles over the conical portion 74, the principal orienting effect of the straight shaft sections 73 which are also eccentric with respect to their directional rotation, takes place. To secure the alignment of the suture line of the peach in a desired position, the jogging and rotating effects of these straight shaft portions 73 operate in the outer more constricted portions of the stem indent. It will be recalled that the rocking movement of pocket element 66 continues throughout its orienting travel, so that after the stem indent registers with the conical portions 74 of the shaft 71, the respective shaft sections 73 become active alternately with respect to the shallow end portions of the stem indent. This is because the relative vertical movement of the orienting means 71, 73, 74, and the element or support 66, shifts the point of engagement of the orienting means parts 73, 73, with the fruit in the support 66 horizontally with reference to the support 66. By reference to Figure 9, it will be seen that, with the support 66 and orienting means 71 in the positional relation shown at the top of the figure, the outer suture locating means 73 is at a comparatively high level relative to the support 66, and the inner suture locating means 73 is at a comparatively low level relative to the support 66. On the other hand, with the support 66 and the orienting means 71 in the positional relation shown in the middle assembly 66, 71, the inner suture locating means 73 is at a comparatively high level relative to the support 66 and the outer suture locating means 73 is at a comparatively low level relative to the support 66. The jogging and rotative action or effect of the end shaft portions 73 serves to rotate the peach about its stem-blossom axis until the shaft sections 73 register with the outer ends of the oval stem indent. This places the suture line of the peach in a plane containing the axis of the orienting shaft 71. In this position, the peach is stable.

It is to be noted that the various orienting actions are applied to the peach while it is traveling through a vertical path and no force components are imparted to the fruit by its travel along its path to disturb the orienting action of the pocket structure. Also after a peach is properly oriented, either at the beginning of its travel along the orienting path or near the end, its oriented position will not be disturbed. The above-described orienting mechanism is claimed in my co-pending application Serial No. 303,913, filed August 12, 1952.

This vertical straight line travel of the peach during orientation and after it is oriented provides for advantageous pick-up of the peach by the transfer mechanism, whose jaws 131 travel with the peach during pick-up.

Figure 8:
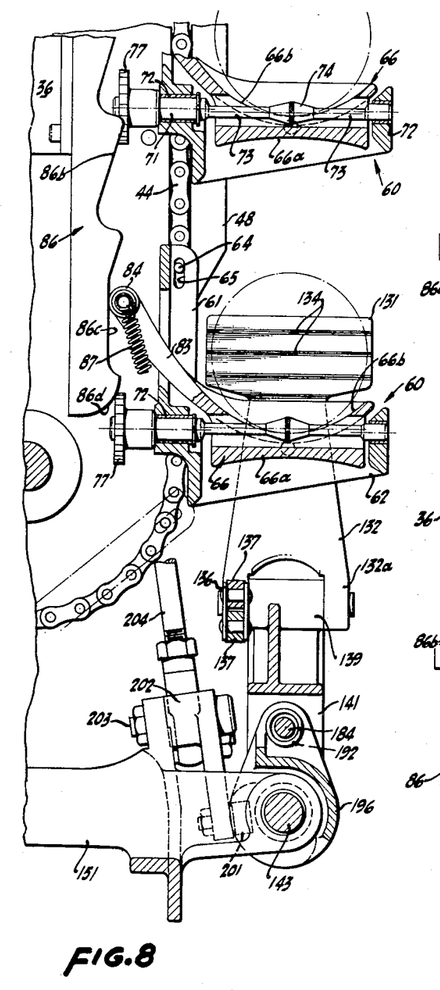
Figure 8 is a sectional elevational view taken as indicated by the line 8—8 in Figure 5.
Figure 10:
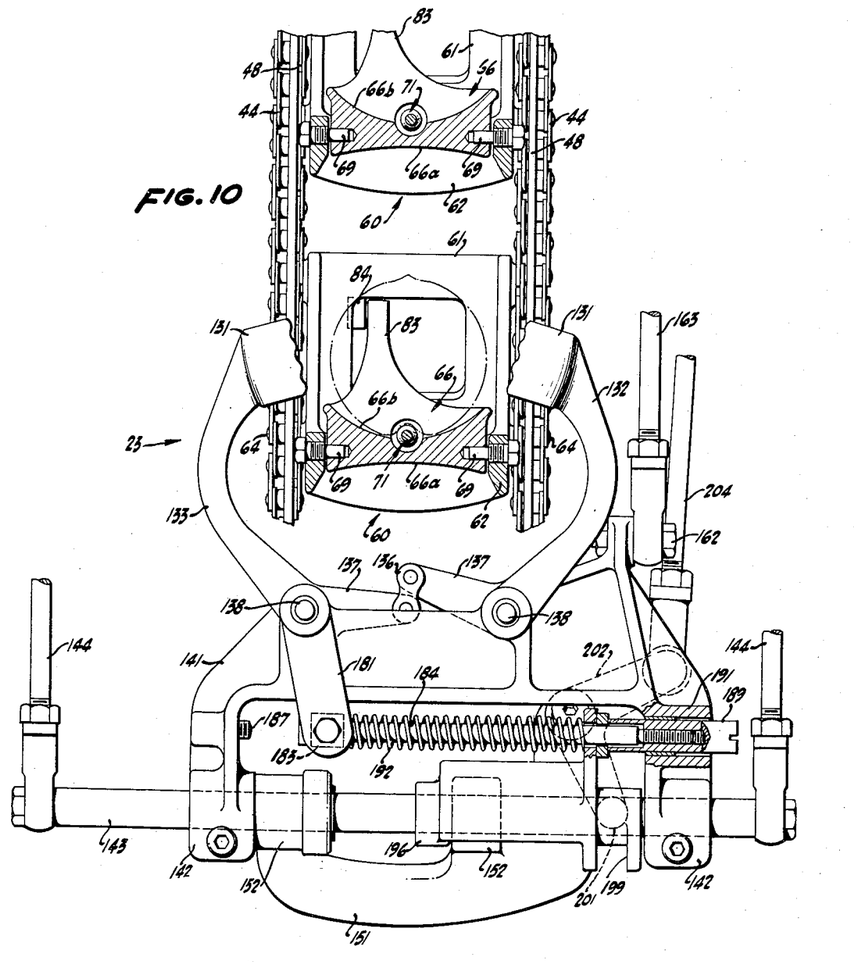
Figure 10 is a view similar to Figure 5 but showing the transfer jaws open with respect to a peach.
Figure 12:
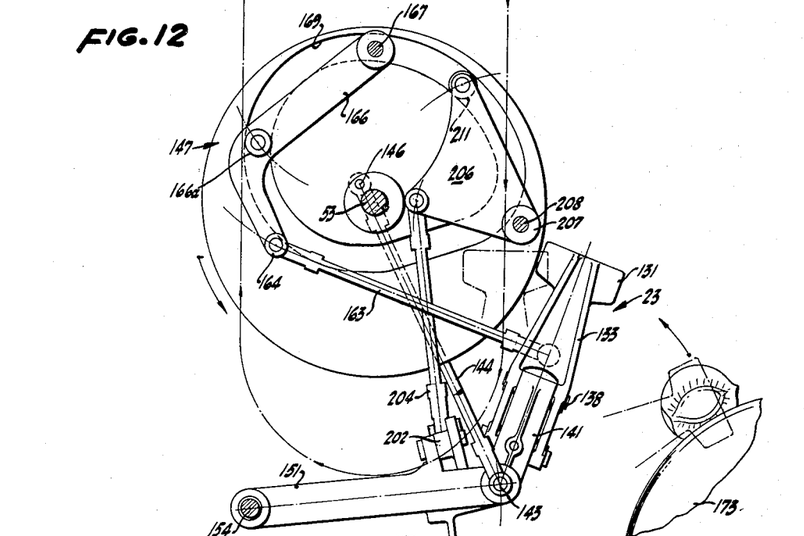
Figure 12 is a view similar to Figure 11, but showing a different operative position of the parts.
Figure 13:
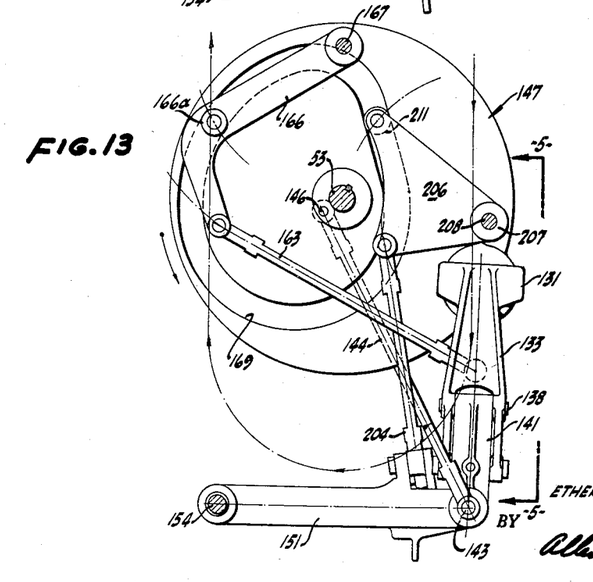
Figure 13 is a view similar to Figures 11 and 12 showing still another operative position of the parts.

As the pocket structures 60 arrive at the lowermost part of their downward travel as illustrated in Figure 1, the jaws 131 are in the open position shown in Figure 10, also illustrated in dotted lines in Figure 12. Figure 14 illustrates a suitable timing diagram of the various movements imparted to the transfer jaws 131, the movements are illustrated from an arbitrary starting point 1, and show the path of movement of the jaws 131 and their point of pivotal support and indicates the open or closed condition of the jaws along the path. At or adjacent to the point 3 in the travel of the jaws between pick-up and delivery position, i.e., when the leading edge of a jaw is past the center of the pocket, the jaws will start to close but will not close sufficiently to engage a peach until they begin the straight line path of travel illustrated in the portion 171 of the path and containing the points 4 and 5. The jaws should be closed upon the peach of smallest diameter by the time they arrive at the point 5. Referring to Figures 8 and 10, the jaws 131 start to close upon the peach and also start the vertical downward travel during their path portion 171 during which time the jaws grasp the oriented fruit and hold it so that the pocket structure recedes from beneath the fruit leaving it free to be carried along the path 172, the pocket element 66 being tipped by the end cam rise 86d to provide for clearance of the pocket. The peach then travels along the path portion 172 and is impaled on the supporting blade 173 in position for the advancing peach feed pin or pusher 216 of the pitter to engage the fruit after it is released by the jaws and push it around the blade 173 into the peach pitter for subsequent processing. Subsequently the jaws 131 travel back along the upper path portion 176 in time for the next succeeding peach in the next succeeding pocket structure 60.

While I have shown and described a preferred embodiment of the invention, it will be understood that the invention is capable of variation and modification from the form shown, so that its scope should be limited only by the proper scope of the claims appended hereto.

I claim:

1. In combination with a peach pitter having peach receiving means and an orienting conveyor that includes a row of orienting mechanisms adapted to support and to orient individual peaches upon actuation of said conveyor, said orienting mechanisms being movable along a substantially straight path in one direction during said actuation of said conveyor for carrying said peaches along said path during orientation thereof, means connected with said conveyor for continuously actuating the latter, a transfer mechanism adjacent to said path and between said peach receiving means and said conveyor including peach gripping means adapted to move into gripping engagement with and to remove peaches from said orienting mechanisms following orientation thereof by said orienting mechanisms and to deliver the peaches so removed to said peach receiving means, mounting means mounting said peach gripping means adjacent to said conveyor for movement into gripping and carrying relation to individual peaches on said orienting mechanisms at a point along said path and for movement of said peach gripping means congruently with said conveyor for a predetermined distance in said one direction along said path, means connected with said peach gripping means for moving said peach gripping means into peach gripping relation during said movement of said peach gripping means congruently with said conveyor for said predetermined distance, said mounting means including means connected with said peach gripping means for moving said gripping means when said peach gripping means is in said gripping relation away from said path and to said peach receiving means after said peach gripping means has moved said predetermined distance.

2. In combination with a peach pitter having peach receiving means and an orienting conveyor that includes a row of orienting mechanisms adapted to support and to orient individual peaches upon actuation of said conveyor, said orienting conveyor including said mechanisms being movable downwardly along a substantially straight, generally vertically extending path of travel during said actuation of said conveyor for carrying said peaches downwardly in said path during orientation thereof, means connected with said conveyor for continuously actuating the latter at a uniform rate of speed, a transfer mechanism between said conveyor and said peach receiving means including peach gripping means actuatable upon actuation of said transfer mechanism for movement into gripping relation to an oriented peach on each of said orienting mechanisms at a point in said path and for movement of said peach gripping means in said peach gripping relation to said peach receiving means, means connected with said transfer mechanism for said actuation thereof to so move said peach gripping means into said peach gripping relation during said movement of said orienting conveyor in said path, said transfer mechanism including means for moving said peach gripping means downwardly along said path parallel therewith and congruently with said orienting mechanisms for a predetermined distance and for subsequently decelerating the movement of said peach gripping means at the lower end of said path whereby said orienting mechanism will move downwardly from beneath a peach gripped by said peach gripping means.

3. In combination with a peach pitter having peach receiving means and an orienting mechanism that includes an endless, generally vertically extending conveyor for providing a pair of upwardly extending flights respectively movable upwardly and downwardly upon actuation of said conveyor, said conveyor having spaced peach supporting cup structures on said flights movable therewith along paths parallel with said flights and said cup structures each being adapted to support a peach thereon, means connected with said conveyor actuating the same to so move said flights and cup structures continuously, a pair of opposed peach gripping members, means mounting said members at the lower end of down flight of said conveyor for movement from peach gripping positions at opposite sides of the path of said cup structures and peaches thereon to said peach receiving means and vice versa, means mounting said peach gripping members for movement downwardly along said path congruently with said cup structures and at the same time toward each other and into engagement with peaches supported on said cup structures when said peach gripping members are at said opposite sides of said path, and means connecting said conveyor with said peach gripping means for so moving said peach gripping means toward each other and along said path congruently with said cup structures.

4. A transfer device for transferring peaches and the like disposed in vertically spaced relation in a descending row thereof from such row to a peach receiving means of a peach pitter, comprising; peach carrying means mounted for movement into peach carrying relation with the lower peach in such row and for movement from said row to said peach receiving means while in said peach carrying relation for carrying said lower peach to said peach receiving means and for movement from said peach receiving means back to said row and into peach carrying engagement with the succeeding lower peach in said row, means connected with said peach carrying means for effecting said movements thereof and for moving said peach carrying means out of peach carrying relation at said peach receiving means, the said means connected with said peach carrying means including means for moving said peach carrying means downwardly a predetermined distance longitudinally of said row when said peach carrying means is at said row and in a position for engaging the lower peach in said row in peach carrying relation and means connected with said peach carrying means for progressively moving the latter into peach carrying relation with the lowermost peach of such row during said movement of said peach carrying means downwardly.

5. A transfer device for transferring peaches and the like disposed in vertically spaced relation in a descending row thereof from such row to a peach receiving means of a peach pitter, comprising; peach carrying means mounted for movement into peach carrying relation with the lower peach in such row and for movement from said row to said peach receiving means while in said peach carrying relation for carrying said lower peach to said peach receiving means and for movement from said peach receiving means back to said row and into peach carrying engagement with the succeeding lower peach in said row, mounting means connected with said peach carrying means for effecting said movements and for moving said peach carrying means out of peach engaging relation at said peach receiving means, the said means mounting said peach carrying means including means for moving said peach carrying means a predetermined distance longitudinally of said row when said peach carrying means is at said row and in a position for engaging the lower peach in said row in peach carrying relation, the said mounting means including a pair of spaced opposed members movable toward each other for gripping the lower peach of said row therebetween, and a plurality of links and cams connected with said members, and a conveyor supporting said peaches in said row, means connected with said conveyor and operatively connected with said links and cams for moving said peach gripping members in synchronism with said conveyor to insure transfer of the successive lower peach in said row.

References Cited in the file of this patent

UNITED STATES PATENTS

| | | |
|---|---|---|
| 1,512,410 | Eldridge | Oct. 21, 1924 |
| 2,572,773 | Slagle | Oct. 23, 1951 |
| 2,692,669 | Slagle | Oct. 26, 1954 |
| 2,738,819 | De Back et al. | Mar. 20, 1956 |
| 2,744,613 | Hait | May 8, 1956 |
| 2,769,521 | Hait | Nov. 6, 1956 |

FOREIGN PATENTS

| | | |
|---|---|---|
| 149,910 | Australia | Feb. 9, 1953 |